J. A. MILLER.
Hose-Reel
No. 167,851.
Patented Sept. 21, 1875.
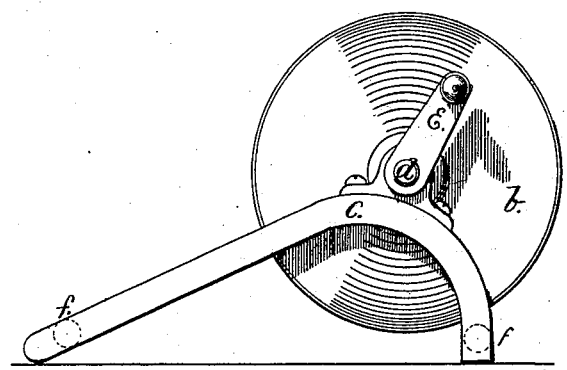
FIG I.
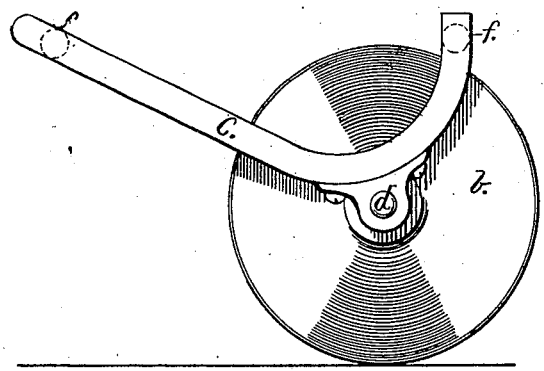
FIG II.
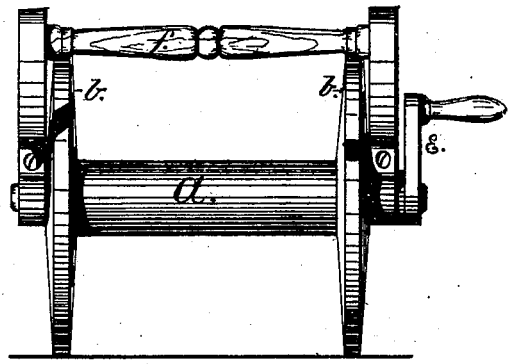
FIG III.
WITNESSES
R. W. Eaton.
J. A. Miller Jr.
INVENTOR
Joseph A. Miller

UNITED STATES PATENT OFFICE.

JOSEPH A. MILLER, OF PROVIDENCE, RHODE ISLAND.

IMPROVEMENT IN HOSE-REELS.

Specification forming part of Letters Patent No. 167,851, dated September 21, 1875; application filed March 17, 1875.

*To all whom it may concern:*

Be it known that I, JOSEPH A. MILLER, of the city of Providence, State of Rhode Island, have invented a new and useful Improvement in Hose-Reels; and I do hereby declare the following to be a full, clear, and exact description thereof, which will enable others skilled in the art to make and use the same, reference being had to the accompanying drawings forming part of this specification.

Figure I is a side view of my improved hose-reel, shown in its position for winding or unwinding the hose. Fig. II is a side view of the same, shown, when used, to be moved from place to place. Fig. III is an end view of the same.

The object of this invention is to make a hose-reel that shall be cheap, shall have a firm support when winding or unwinding the hose, and shall be easily moved from place to place.

The nature of the invention consists in the peculiar arrangement of the supporting-frame, which can be easily reversed, and the reel and hose moved from place to place, as is more fully set forth hereinafter.

In the drawings, $a$ is the barrel or drum of the reel. $b\ b$ are two disks or wheels forming the ends of the reel. The reel is supported by its axis on the frame, consisting of two bent arms, $c\ c$, secured together by the rounds $f\ f$, as shown in Fig. I. The ends of the arms $c\ c$ rest on the ground and support the reel sufficiently above the ground to allow the same to turn freely. One end of the arms $c\ c$ is nearer to the center of the reel than the other, and rests on the ground near the center of gravity of the reel, while the other extends considerably beyond the reel. When, therefore, the longer end of the arms $c\ c$ is raised, the reel is easily reversed, as the weight of the reel and hose assists in thus reversing the same, and when so reversed the weight, resting on the disks or wheels $b\ b$, may be rolled along the ground, as is shown in Fig. II, and the reel and hose easily transported from place to place. When the hose is to be unwound the reel is easily reversed and again firmly supported on the frame. The shape of the arms $c\ c$ giving a long base, support the reel firmly. Instead of the bent arms, as shown, for supporting the reel, any other form or frame having one support near the center of gravity, and another at a greater distance from the same, may be used, accomplishing the same result; but I prefer the bent arms $c\ c$ as being simple, cheap, and efficient.

A hose-reel constructed in this manner has many advantages over the ordinary hose-reel, as it can be manufactured and sold at a low price. It may be used in all cases where hose are used for washing walks or watering gardens, and, as the reel forms also the means of transporting the hose, the hose will not be dragged over the ground and thus injured, as it is easier to wind the same on the reel and transport the whole to the desired place. Such a reel will preserve the hose from injury, and, in the ordinary family use for washing walks or watering gardens, a child may move the same to any desired place.

In manufactories such a reel may be placed against the wall, the arms $c\ c$ supporting the reel off the wall, and the hose may be reeled on or off; or the reel with the hose may be easily rolled to any place where the same may be required, thus, in case of fire, saving much valuable time.

Having thus described my invention, I claim as new and desire to secure by Letters Patent—

1. The combination of the hose-reel, consisting of the barrel $a$ and disks or wheels $b\ b$ secured to the barrel, with the arms $c\ c$, one end of each being shorter, measured from the center of the reel, than the other, substantially as and for the purpose described.

2. The curved arms $c\ c$, secured together to form the support for a hose-reel, as and for the purpose set forth.

3. The combination, in a hose-reel, of a frame for supporting the reel in one position and to be supported by the reel in a reverse position, with the disks or wheels forming the ends of the reel, and also used for transporting the same, as herein described.

JOSEPH A. MILLER.

Witnesses:
W. C. KING,
J. A. MILLER, Jr.